United States Patent [19]

Boettner

[11] 3,932,083
[45] Jan. 13, 1976

[54] INJECTION MOLDING CONTROL
[75] Inventor: Jon E. Boettner, Owens Township, Winnebago County, Ill.
[73] Assignee: Barber-Colman Company, Rockford, Ill.
[22] Filed: Nov. 29, 1974
[21] Appl. No.: 528,213

Related U.S. Application Data
[62] Division of Ser. No. 421,115, Dec. 3, 1973.

[52] U.S. Cl. .................... 425/145; 425/149
[51] Int. Cl.² .... B29F 1/02; B29F 1/022; B29F 1/06
[58] Field of Search .......... 425/145, 149, 151, 155, 425/159

[56] References Cited
UNITED STATES PATENTS
| | | | |
|---|---|---|---|
| 3,693,946 | 8/1972 | Merritt | 425/145 |
| 3,712,772 | 1/1973 | Hunkar | 425/141 |
| 3,721,512 | 3/1973 | Ma et al. | 425/149 |
| 3,752,363 | 8/1973 | Fegley et al. | 425/145 |
| 3,767,339 | 10/1973 | Hunkar | 425/149 |
| 3,840,312 | 10/1974 | Paulson et al. | 425/149 |

Primary Examiner—Francis S. Husar
Assistant Examiner—R. J. Charvat
Attorney, Agent, or Firm—A. Richard Koch

[57] ABSTRACT

The control system for an injection molding machine providing successive fill, compaction, hold, cure and mold open times. The ram position and mold pressure are monitored at predetermined times respectively after the molding cycle has begun. If the ram position is out of tolerance, the fill pressure is adjusted to compensate for the deviation. If the mold pressure is out of tolerance, the compaction pressure is adjusted to compensate for the deviation in mold pressure.

5 Claims, 4 Drawing Figures

INJECTION MOLDING CONTROL

This is a division of application Ser. No. 421,115, filed Dec. 3, 1973.

BACKGROUND OF THE INVENTION

In injection molding of thermoplastic material it is desirable that the parts produced be uniform in shape, size, weight, strength and appearance. These characteristics are partly dependent upon the properties of the material and the design of the mold, but they are also the result of the control exercised over the molding operating. Such characteristics are dependent upon the temperataure of the material, the rate of flow of the plasticized material into the mold and the density of the material in the mold.

The temperature of the plasticized material, or melt, being injected into the mold must be maintained within its working range. The rate of flow of the plasticized material into the mold determines the flow pattern in the mold, how well the mold is filled and the orientation of the molecules of the material. The rate of flow is dependent upon the viscosity of the melt and the pressure applied to it, the viscosity, in turn, being inversely related to temperature. The density of the material in the mold is dependent upon the complete filling of the mold, the viscosity of the melt in the mold and the pressure applied to it.

There is a fundamental relationship between the pressure, volume and temperature of a plasticized material expressed in the Spencer and Gilmore equation:

$$(P + \pi)(V - \omega) = RT$$

in which
P = plastic pressure
V = plastic volume
T = plastic temperature
$\pi$ = constant for the plastic
$\omega$ = constant for the plastic
R = constant for the plastic It will be seen that a change in any variable will result in a change of at least one other variable, so that manipulation of one variable may be employed to compensate for changes in another variable.

During the primary injection portion of the molding cycle, the primary injection pressure supplied to move the ram has been held substantially constant. As the ram is moved forward by the primary injection pressure the ram is moved at a substantially constant speed while the melt is injected through a nozzle into the mold cavity until the cavity is substantially filled, being limited only by the rate of flow of the melt through the gate, which rate is dependent upon melt viscosity. After the mold cavity has been initially filled, the ram continues to move forward, but at a greatly reduced speed, as the melt is compacted in the cavity, until the mold pressure plus the pressure drops in the flow passages equals the pressure exerted by the ram on the melt, at which time forward movement of the ram ceases. The mold pressure builds up slowly until the cavity is initially filled, after which it rapidly increases while the melt is being compacted until it equals the pressure exerted by the ram.

Without any control, if the viscosity of the melt had increased, as in response to a variation in composition, the opposing pressure on the ram would increase, slowing flow of the melt into the mold cavity and so reducing the time for compaction. The melt begins to set-up as soon as it enters the mold. With the slower flow the melt has a longer time to set-up before the cavity is filled and so builds up a greater resistance to compaction, the result being that the peak mold pressure is lower. Finally, as a result of the lower peak pressure, the subsequent parts will be smaller and lighter than before. If the viscosity of the melt had decreased, the cavity would fill faster, the melt would not set-up as much before the cavity was filled, the compaction time would be longer, the peak pressure would be higher, and the subsequent parts would be larger and heavier. The change in length of the finished parts is due to resilience when the pressure is removed, while the change in weight is due to different densities resulting from the difference in compaction.

Many different systems have been employed in efforts to provide the most consistent results at the lowest possible price. When manual controls are employed, the quality of the product is dependent upon the experience and skill of the operator. Automatic controls usually produce more uniform quality throughout a production run and also from run to run. Some automatic controls are so simple that they do not produce satisfactory results, while others are so complex they cannot be economically justified. Better and less expensive controls are always sought.

Some automatic controls have controlled the speed of the ram as it injects the melt into the mold cavity by adjusting the primary injection pressure. This compensates for changes in viscosity while the mold is being filled, but the adjusted pressure is also employed to compact the material in the mold. If the melt viscosity has increased, the primary pressure is adjusted upward to compensate for the resulting reduced flow. This will typically produce more dense, heavier and longer parts than without controls. Conversely, if the melt viscosity decreases, the primary pressure is adjusted downward typically producing less dense, lighter and shorter parts than without the control. Controls dependent solely upon ram speed tend to overcompensate for viscosity changes.

Other automatic controls have controlled the pressure in the filled mold cavity by adjusting the primary injection pressure, but the adjusted pressure is also employed to inject material into the mold during the following molding cycles. An increase in mold pressure at a predetermined time in the primary injection cycle indicates a decrease in melt viscosity, while a decrease in mold pressure indicates an increase in melt viscosity. If the melt viscosity has increased, the mold pressure will decrease, requiring a compensatory upward adjustment of primary injection pressure and typically resulting in production of shorter and lighter parts than without the control. Conversely, if the melt viscosity has decreased, the mold pressure will increase, requiring a downward adjustment of primary injection pressure and typically resulting in production of longer and heavier parts. Mold pressure control thus tends to under-compensate for viscosity changes.

SUMMARY OF THE INVENTION

This invention provides for automatically controlling an injection molding machine to consistently produce molded parts of satisfactorily uniform quality by a relatively simple and inexpensive means. It divides the primary injection cycle into two periods — a fill period and a compaction period. It monitors ram position at a predetermined time after initiation of a primary injection cycle and while the mold cavity is being filled as an indication of the viscosity of the melt flowing into the mold cavity. If the sensed position deviates from a predetermined set point, the injection pressure applied to move the ram during the fill period, hereinafter referred to as fill pressure, is adjusted to compensate for the difference in viscosity. At a second predetermined time after initiation of the primary injection cycle and after the mold cavity has been filled, but before the mold pressure is substantially reduced, it monitors mold pressure as an indication of density of the plasticized material in the cavity. If the sensed mold pressure deviates from a predetermined set point, the injection pressure applied to move the ram during the compaction period, hereinafter referred to as compaction pressure, is adjusted to compensate for the difference in density.

DESCRIPTION OF THE PREFERRED EMBODIMENT

Figure 1:
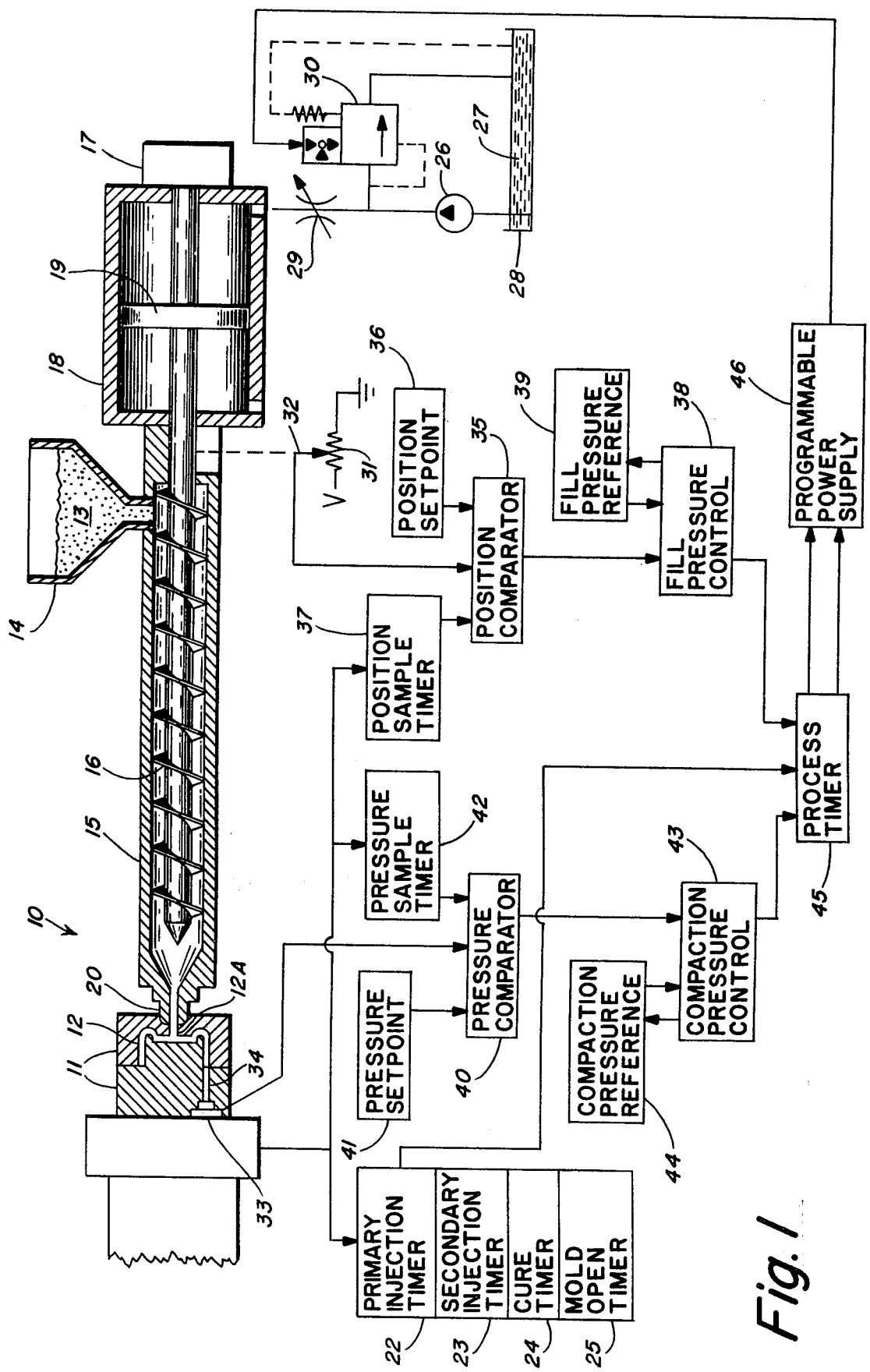
FIG. 1 is a block diagram of a primary injection pressure control system according to this invention combined with a schematic diagram of an injection molding machine and the hydraulic control circuit employed to provide injection pressure.

FIG. 1 shows a typical injection molding machine, a hydraulic control circuit employed to provide injection pressure and that portion of an automatic control therefor exercising primary injection cycle control according to this invention. The molding machine 10 comprises a mold 11 having a cavity 12 therein to receive a plasticized molding material. Particulate molding material 13 is fed by gravity from a hopper 14 into an extrusion barrel 15. A combination screw and ram 16 is rotatable in the barrel by a motor 17 to plasticize the molding material by shearing and working it, thereby generating heat. An hydraulic injection cylinder 18 at the rear end of the barrel has a piston 19 therein movable by hydraulic pressure to move the ram 16 lengthwise in the barrel. When the ram is moved forward by the piston, plasticized molding material, or melt, is injected into the mold cavity 12 through a nozzle 20. Conventional machine timers 22, 23, 24 and 25 control the primary injection, secondary injection, cure and mold open sequence. The timers are triggered by a mold lock-up signal from the machine 10. We are concerned solely with the primary injection period.

A continuously running pump 26 delivers a hydraulic fluid 27 from a sump 28 through a flow restricting valve 29 to cylinder 18 behind piston 19 so as to move the piston forward. The fluid delivered by the pump is at a relatively high pressure, which is regulated by a normally open electro-hydraulic pressure relief valve 30, controlling return of the pressurized fluid to the sump in well-known manner.

A position transducer, show as a potentiometer 31, is coupled to the ram 16 to provide a position signal responsive to ram position. Most molding machines have a position indicator to which the wiper 32 of the potentiometer may be connected. A mold pressure transducer 33, such as a strain gauge, is located in communication with the mold cavity 12 to provide a signal responsive to mold pressure. The mold pressure could be sensed in the mold cavity 12, in the gate 12A, or in the sprue and runner system. As shown the mold pressure is transmitted to the pressure transducer 33 through a dummy ejector pin 34.

A position comparator 35 is connected to receive a variable ram position signal from the position transducer 31, a predetermined constant setpoint signal from an adjustable ram position setpoint 36 and a position sample time signal from a position sample timer 37. The comparator delivers a ram position deviation signal as a function of the deviation of the sensed ram position from the setpoint position and of a polarity corresponding to the direction of the deviation when the position sample timer delivers its signal at a predetermined time after it receives the mold lock-up signal and while the cavity 12 is being filled with the melt. A fill pressure control 38 sums the ram position deviation signal and a fill pressure reference signal from a fill pressure reference 39 to provide a fill pressure control signal.

A pressure comparator 40 is connected to receive a variable mold pressure signal from the pressure transducer 33, a predetermined constant pressure setpoint signal from an adjustable mold pressure setpont 41 and a pressure sample time signal from a pressure sample timer 42. The pressure comparator delivers a mold pressure deviation signal as a function of the deviation of the sensed mold pressure from the setpoint pressure and of a polarity corresponding to the direction of the deviation. The pressure sample timer delivers its signal at a predetermined time after it receives the mold lock-up signal from the machine 10 and after the cavity 12 has been filled with the melt, but before the pressure in the mold is substantially reduced. A compaction pressure control 43 sums the mold pressure deviation signal and a compaction pressure reference signal from a compaction pressure reference 44 to provide a compaction pressure signal.

A process timer 45 is energized during the primary injection period by a signal received from the primary injection timer 22. It divides the primary injection period into a fill period and a compaction period. During the fill period it delivers the fill pressure signal to a programmable power supply 46 and during the compaction period it delivers the compaction pressure signal to the programmable power supply. The programmable power supply delivers a valve control signal responsive to the received fill and compaction pressure signals to the electrohydraulic pressure relief valve 30 to control the hydraulic pressure supplied to cylinder 18 during the primary injection period, and thereby to adjust independently the injection pressures on the plasticized material during the fill and compaction portions of the primary injection period as required to produce the desired ram position and mold pressure at the respective predetermined times.

Figure 2:
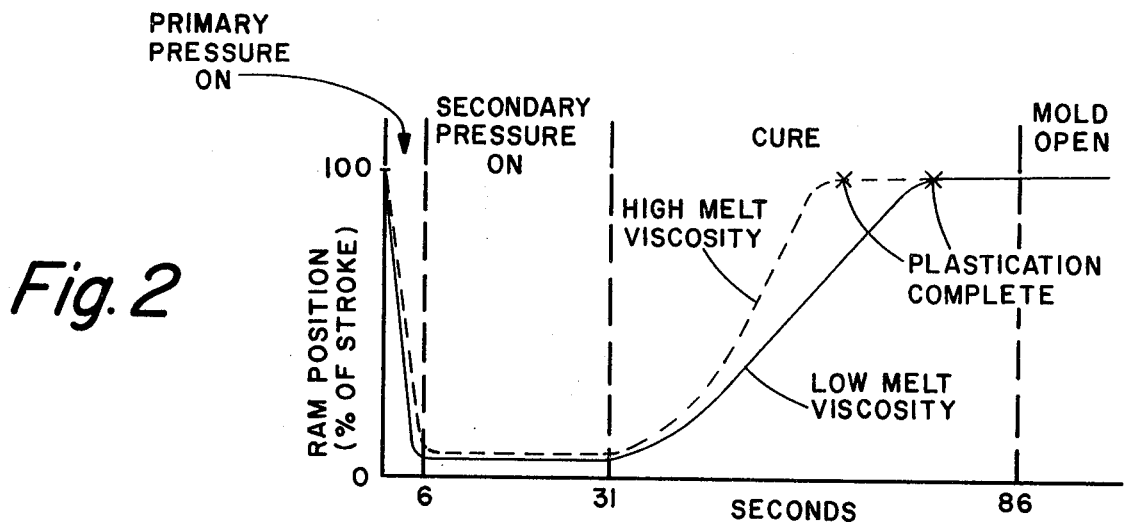
FIG. 2 is a graph of ram position plotted against time during a typical prior art injection molding cycle.
Figure 3:
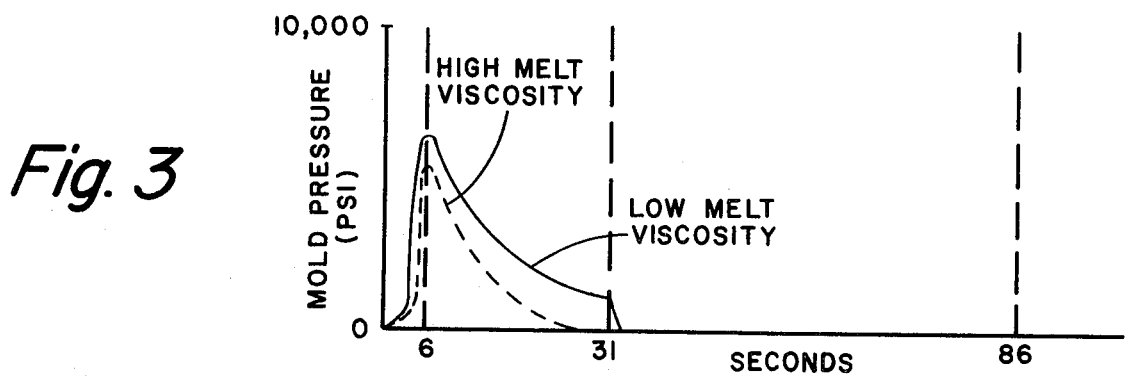
FIG. 3 is a graph of mold pressure plotted against time during a typical prior art injection molding cycle.

FIGS. 2 and 3 show variations in ram position and mold pressure with time during a typical injection molding cycle according to the prior art. The zero time is determined by the mold lock-up signal provided when the halves of the mold are clamped together and the cavity is in condition to receive the melt. The primary pressure on time is determined by the primary injection timer 22, the secondary pressure on time by the secondary injection timer 23, the cure time by the cure timer 24 and the mold open time by the mold open timer 25.

During the primary pressure on time a predetermined high hydraulic pressure regulated by pressure relief valve 30 is delivered to the cylinder 18, moving the piston 19 and connected ram 16 forward, thereby injecting melt from extrusion barrel 15 through nozzle 20 into cavity 12. The time is set long enough to permit complete filling of the cavity and compaction of the melt in the cavity. It is generally set to allow mold pressure to attain its maximum value for any reasonable variation in melt viscosity. It will be seen in FIG. 2 that with a low melt viscosity the ram completes its stroke filling the mold cavity in less time than with a high melt viscosity. FIG. 3 shows that with a low melt viscosity a higher mold pressure is obtained than with a high melt viscosity. In order to optimize production the primary pressure on time, as well as other cycle times, is kept as short as possible.

During the secondary pressure on time the hydraulic pressure in cylinder 18 is usually reduced by pressure relief valve 30 to a predetermined holding pressure to substantially prevent back flow of the melt. The time is set to permit solidification, or curing, of the melt in the gate to such an extent that the melt will not flow out of the mold when the pressure is removed. The ram does not substantially move during this time, but the mold presssure decreases as the temperature of the melt declines and melt in the cavity begins to cure. FIG. 2 shows the substantially steady ram positions, and FIG. 3 shows the progressively decreasing mold pressures with passage of time. The mold pressure curves are similar for both melt viscosities, but are offset due primarily to the difference in peak pressures. Ideally the mold pressures should fall to zero during this time as the high melt viscosity curve does.

During the cure time hydraulic pressure is released from the cylinder 18 so that the ram 16 is permitted to move backward and all mold pressure is removed. When the secondary injection pressure is released, the motor 17 begins to rotate the ram 16, plasticating by shearing and working the molding material 13, flowing by gravity from hopper 14 into the extrusion barrel 15, as the ram turns. The ram, acting as a screw, moves the material forward in the barrel, building up a pressure in the forward end of the barrel that forces the ram backward to its initial rearward position. This backward movement is generally opposed by a predetermined back pressure in cylinder 18. When it has moved into this initial position the motor 17 stops rotating and plastication is complete. The cure time extends beyond the completion of plastication until the melt forming the part being molded in the cavity 12 is cured sufficiently to retain its shape when removed from the mold.

During the mold open time, the mold is unlocked and opened and the molded part is removed. The mold open time need only be long enough to permit such removal, after which the mold is reclosed and locked-up, ready for a new cycle.

The present invention concerns only the primary pressure on time, which is divided into two periods referred to as the fill time and the compaction time, the division being accomplished by process timer 45, energized through primary injection timer 22. In the examples shown in FIGS. 2 and 3, the fill time might be typically taken as 3.5 sec., with the compaction time occupying the remainder of the 6 sec. primary pressure on time, or 2.5 sec.. The primary injection pressure is replaced by independent fill and compaction pressures delivered to cylinder 18 during the fill and compaction times respectively.

When the mold 12 is closed and locked-up, a lock-up signal is delivered from the machine 10 to the primary injection timer 22, the position sample timer 37 and the pressure sample timer 42 to start timing. The primary injection timer immediately energizes process timer 45, with transfers the fill pressure signal to the programmable power supply 46. The power supply delivers a valve control signal, responsive to the fill pressure signal, to the electro-hydraulic relief valve 30, which partially closes, restricting return of hydraulic fluid 27 to sump 28 and so building up hydraulic pressure in cylinder 18. The build up in pressure in the cylinder is slowed by the flow restricting valve 29. Pressure in cylinder 18 moves piston 19 and the connected ram 16 forward, extruding melt from extrusion barrel 15 through the nozzle 20 and injecting it into cavity 12.

As the ram moves forward the coupled wiper 32 advances across potentiometer 31 from the grounded end toward the end connected to a voltage supply V, producing a position signal proportional to ram position, which signal is delivered to position comparator 35. A position setpoint signal is supplied from an adjustable position setpoint means 36 to the position comparator, the setpoint signal being equal to the position signal at a predetermined position of the ram. At a predetermined time after the lock-up signal has been received, the position sample time 37 transmits a position sample signal to the position comparator 35. If, when the position sample signal is received, there is a difference between the position and position setpoint signals, a ram position deviation signal is delivered to the fill pressure control 38. A fill pressure reference means 39 provides a fill pressure reference signal to the fill pressure control, which sums the ram position deviation and fill pressure reference signals to provide the fill pressure control signal. The ram position deviation signal is of such a value that, when added to the fill pressure reference signal, it will produce a fill pressure control signal that will modify the hydraulic pressure delivered to cylinder 18 sufficiently to correct the deviation in ram position on the next cycle. The fill pressure control signal then becomes the new fill pressure reference signal for the next cycle. The initial fill pressure reference signal is set manually, as by a potentiometer, in accordance with prior experience.

The pressure in the cavity 12 is sensed as by a strain gauge or other pressure transducer 33, which provides a proportional mold pressure signal to pressure comparator 40.

A mold pressure setpoint signal is supplied from an adjustable mold pressure setpoint means 41 to the pressure comparator, the setpoint signal being equal to the mold pressure signal produced by a predetermined mold pressure desired to be held at a preestablished time after mold lock-up. At said preestablished time after the lock-up signal has been received, the pressure sample timer 42 transmits a pressure sample signal to the pressure comparator 40. If, when the pressure sample signal is received, there is a difference between the mold pressure and mold pressure setpoint signals, a pressure deviation signal is delivered to the compaction pressure control 43. A compaction pressure reference means 44 provides a compaction pressure reference signal to the compaction pressure control, which sums the pressure deviation and compaction reference signals to provide the compaction pressure control signal. The initial compaction pressure reference signal is set manually, as by a potentiometer, in accordance with prior experience. Thereafter the compaction pressure control signal becomes the new compaction pressure reference signal for the next cycle.

In a preferred embodiment, the position and mold pressure setpoints 36, 41 cover a range of values defined by upper and lower limits. The comparators 35, 40 then provide deviation signals only when the transducers 31, 33 provide signals above the maximum or below the minimum limits. If the upper and lower limits coincide, there is but one reference value from which deviations are measured. When upper and lower limits are employed, the deviation signal produced is usually a predetermined step so that the pressure adjustments are made upward and downward in correspondingly predetermined increments.

Figure 4:
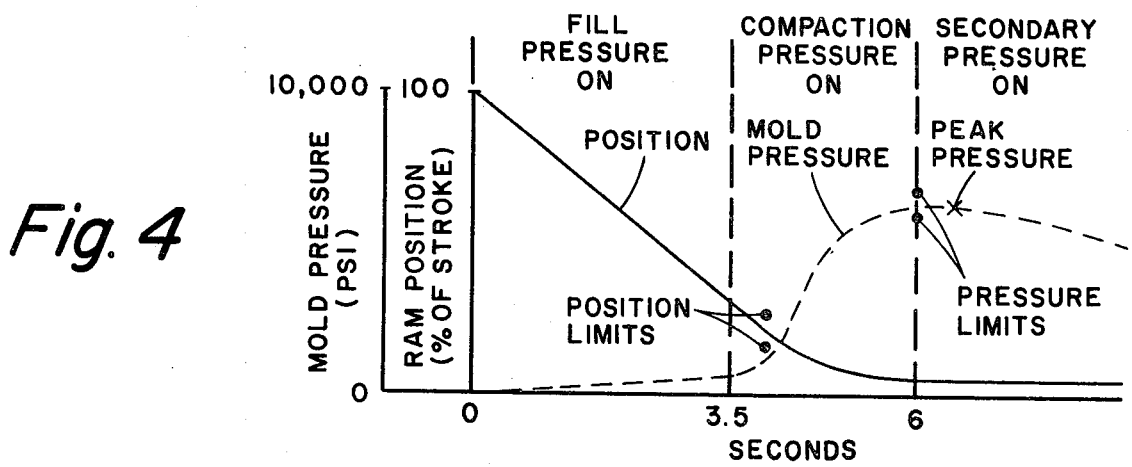
FIG. 4 is a graph of ram position and mold pressure with their setpoint limits plotted against time according to this invention.

FIG. 4 shows the relationship between fill and compaction pressures, and position and pressure limits as they apply to the low melt viscosity material in FIGS. 2 and 3. Fill pressure on time is set to end when mold pressure begins to build up more rapidly which marks the beginning of compaction of the melt in the cavity 12. The substantially linear forward motion of the ram may continue after the fill pressure is replaced by compaction pressure due to the relatively small amount of compaction initially occurring. The position limits are set at some point along, but preferrably near the end of, the substantially linear portion of the position curve, regardless of whether they fall within the fill or compaction pressure times. The pressure limits are set at some point after compaction begins, but before the mold pressure falls appreciably after reaching its peak. Preferably the pressure limits are set near the peak mold pressure, regardless of whether they fall within the compaction or secondary pressure times. In FIG. 4 the position limits are shown in the compaction pressure time at the end of the substantially linear portion of the position curve. The pressure limits are shown at the end of the compaction time before the peak mold pressure is reached. The curves in FIG. 4 are the same as the low melt viscosity curves in FIGS. 2 and 3. When the limits are at, or beyond, the ends of the periods during which the pressures to be controlled are applied, the correction, if any, occurs on the next molding cycle. There is some lag in the application of the controlled hydraulic pressures to the piston 19 resulting from mechanical delay encountered in the electrohydraulic relief valve 30 and hydraulic delays introduced by the restriction introduced by the restriction introduced by flow valve 29. It is primarily the result of such delays that the peak mold pressure falls in the secondary pressure on time.

The embodiment shown and described is only a preferred example of the invention and does not define the scope of the invention which is limited solely by the claims.

I claim:

1. An automatic control system for injection molding machines having a reciprocable ram for injecting plasticized materials from an extrusion barrel into a mold cavity, said system comprising a position transducer producing a position signal varying with the position of the ram, a position setpoint means establishing a position setpoint signal, a position sample timer producing a position sample signal at a predetermined time after initiation of an injection cycle, a position comparator supplying a position deviation signal in response to deviation of said position signal from the position setpont signal upon occurrence of said position sample signal, means for adjusting a fill pressure in compliance with the position deviation signal to compensate for said position deviation, a pressure transducer producing a pressure signal varying with the pressure in said mold cavity, a pressure setpoint means establishing a pressure setpoint signal, a pressure sample timer producing a pressure sample signal at a predetermined second time after initiation of the injection cycle, a pressure comparator supplying a pressure deviation signal in response to deviation of said pressure signal from the pressure setpoint signal upon occurrence of said pressure sample signal, and means for adjusting a compaction pressure in compliance with the pressure deviation signal to compensate for said pressure deviation, said position sample signal being produced prior to completion of filling of the mold cavity, and said pressure sample signal being produced after completion of filling of the mold cavity.

2. An automatic control system according to claim 1 wherein said sample timers produce the sample signals at adjustable times after initiation of said injection cycle.

3. An automatic control system according to claim 1 wherein said setpoint means are adjustable.

4. An automatic control system according to claim 1 wherein said setpoint means determine upper and lower limits.

5. An automatic control system according to claim 1 wherein the deviation signals supplied by said comparators are step signals.

\* \* \* \* \*